US007229659B2

(12) United States Patent
Shen (10) Patent No.: US 7,229,659 B2
(45) Date of Patent: Jun. 12, 2007

(54) PROCESS FOR MAKING STABLE PROTEIN BASED ACID BEVERAGE (75) Inventor: Cheng Shen, Kirkwood, MO (US)

(73) Assignee: Solae, LLC, St. Louis, MO (US)

( * ) Notice: Subject to any disclaimer, the term of this patent is extended or adjusted under 35 U.S.C. 154(b) by 299 days.

(21) Appl. No.: 10/462,894

(22) Filed: Jun. 17, 2003

(65) Prior Publication Data

US 2004/0258827 A1 Dec. 23, 2004

(51) Int. Cl.
A23J 1/00 (2006.01)
A23J 1/14 (2006.01)

(52) U.S. Cl. .................. 426/598; 426/590; 426/656

(58) Field of Classification Search ................ 426/656, 426/590, 598
See application file for complete search history.

(56) References Cited

U.S. PATENT DOCUMENTS

| | | | | |
|---|---|---|---|---|
| 4,039,696 A | * | 8/1977 | Marquardt et al. | 426/598 |
| 4,138,500 A | | 2/1979 | Fulger et al. | 426/46 |
| 5,286,511 A | * | 2/1994 | Klavons et al. | 426/577 |
| 5,514,655 A | | 5/1996 | DeWille et al. | 514/21 |
| 5,658,609 A | * | 8/1997 | Abboud et al. | 426/609 |
| 6,221,419 B1 | * | 4/2001 | Gerrish | 426/577 |
| 6,268,195 B1 | | 7/2001 | Christensen et al. | 435/196 |
| 6,287,623 B1 | | 9/2001 | Nakayama et al. | 426/584 |
| 6,303,160 B1 | * | 10/2001 | Laye et al. | 426/36 |
| 6,621,419 B2 | | 9/2003 | Chiu | 426/577 |
| 6,811,804 B2 | * | 11/2004 | Patel et al. | 426/598 |
| 6,861,080 B2 | * | 3/2005 | Kent et al. | 426/36 |
| 6,887,508 B2 | * | 5/2005 | Huang | 426/573 |

FOREIGN PATENT DOCUMENTS

EP 1250845 A1 10/2002
WO WO 03/043446 A1 5/2003

OTHER PUBLICATIONS

Thakur et al., Chemistry and Uses or Pectin- A Review, Critical Reviews in Food Science and Nutrition, 47(1) 47-73 (1997).

* cited by examiner

Primary Examiner—Anthony Weier
(74) Attorney, Agent, or Firm—James L. Cordek; Holly M. Amjad; Cary A. Levitt

(57) ABSTRACT

This invention is directed to a process for preparing a stable suspension of a protein material in an acidic beverage, having;
blending
(A) a hydrated and homogenized protein material slurry with
(B) a hydrated protein stabilizing agent-acid dispersion, and pasteurizing and homogenizing the blend.

In an alternative embodiment, the invention is directed to a process for preparing a stable suspension of a protein material in an acidic beverage, having;
blending
(A$^1$) a hydrated and homogenized protein material-protein stabilizing agent slurry with
(B) a hydrated protein stabilizing agent-acid dispersion, and pasteurizing and homogenizing the blend.

37 Claims, 3 Drawing Sheets

PROCESS FOR MAKING STABLE PROTEIN BASED ACID BEVERAGE

FIELD OF THE INVENTION

This invention relates to a process for preparing a protein based acid beverage which is smooth, tasteful, palatable and has good storage stability.

BACKGROUND OF THE INVENTION

Juices and other acidic juice-like beverages are popular commercial products. Consumer demand for nutritional healthy beverages has led to the development of nutritional juice or juice-like beverages containing protein. The protein provides nutrition in addition to the nutrients provided by the components of the beverage. Recently it has been discovered that certain proteins have specific health benefits beyond providing nutrition. For example, soy protein has been recognized by the United States Food and Drug Administration as being effective to lower blood cholesterol concentrations in conjunction with a healthy diet. In response, there has been a growing consumer demand for acidic juice-like beverages containing proteins that provide such specific health benefits.

A hurdle to adding protein to acidic beverages, however, is the relative insolubility of proteins in an aqueous acidic environment. Most commonly used proteins, such as soy proteins and casein, have an isoelectric point at an acidic pH. Thus, the proteins are least soluble in an aqueous liquid at or near the pH of acidic beverages. For example, soy protein has an isoelectric point at pH 4.5 and casein has an isoelectric point at a pH of 4.7, while most common juices have a pH in the range of 3.7 to 4.0. As a result, protein tends to settle out as a sediment in an acidic protein-containing beverage-an undesirable quality in a beverage.

Protein stabilizing agents that stabilize proteins as a suspension in an aqueous acidic environment are used to overcome the problems presented by protein insolubility. Pectin is a commonly used protein stabilizing agent.

U.S. Pat. No. 5,286,511 (Klavons et al., Feb. 15, 1994) provides a beverage such as orange juice that is clouded by a suspension of soy protein particles, where the protein particles are prevented from aggregating to the point of settling out by pectin. Pectin inhibits the protein from settling by adsorbing to individual protein particles and imparting an overall negative charge to the protein particles, resulting in repulsion of the particles from one another, and thereby preventing the protein particles from aggregating and settling out of the suspension. Pectin also increases the viscosity of the beverage, which helps stabilize protein particles against gravitational forces.

U.S. Pat. No. 6,221,419 (Gerrish, Apr. 24, 2001) relates to a pectin for stabilizing proteins particularly for use in stabilizing proteins present in aqueous acidified milk drinks. It must be understood that the inclusion of pectin has both desirable and undesirable effects on the properties of acidified milk drinks. While pectin can act as a stabilizer against sedimentation of casein particles or whey separation, it can have the disadvantage of increasing the viscosity of the drink due to its cross-linking with naturally co-present calcium cations rendering the drink unpalatable. It will be seen that in the absence of pectin, there is significant sedimentation in the case of both drinks caused by the instability of the casein particles which also results in relatively high viscosity. After a certain concentration of pectin has been added, the casein particles become stabilized against sedimentation after which increasing the pectin concentration has little effect on sedimentation. Turning to the viscosity of the drinks, this also significantly drops on stabilisation of the casein particles but then almost immediately begins to rise again due to cross-linking of the excess pectin added by the co-present calcium cations. This increased viscosity is undesirable as it leads to the beverage having poor organoleptic properties. This range may be as narrow as only 0.06% by weight of pectin based upon the beverage weight as a whole. Below this working range, sedimentation is a significant problem, whereas above it, the viscosity of the beverage is undesirably high.

Pectin, however, is an expensive food ingredient, and manufacturers of aqueous acidic beverages containing protein desire less expensive stabilizers, where the amount of required pectin is either reduced or removed in favor of less expensive stabilizing agents.

SUMMARY OF THE INVENTION

This invention is directed to a process for preparing a stable suspension of a protein material in an acidic beverage, comprising;

blending
(A) a hydrated and homogenized protein material slurry with
(B) a hydrated protein stabilizing agent-acid dispersion, and pasteurizing and homogenizing the blend.

In a second embodiment, the invention is directed to a process for preparing a stable suspension of a protein material in an acidic beverage, comprising;

blending
($A^1$) a hydrated and homogenized protein material-protein stabilizing agent slurry with
(B) a hydrated protein stabilizing agent-acid dispersion, and pasteurizing and homogenizing the blend.

DETAILED DESCRIPTION OF THE INVENTION

Figure 1:
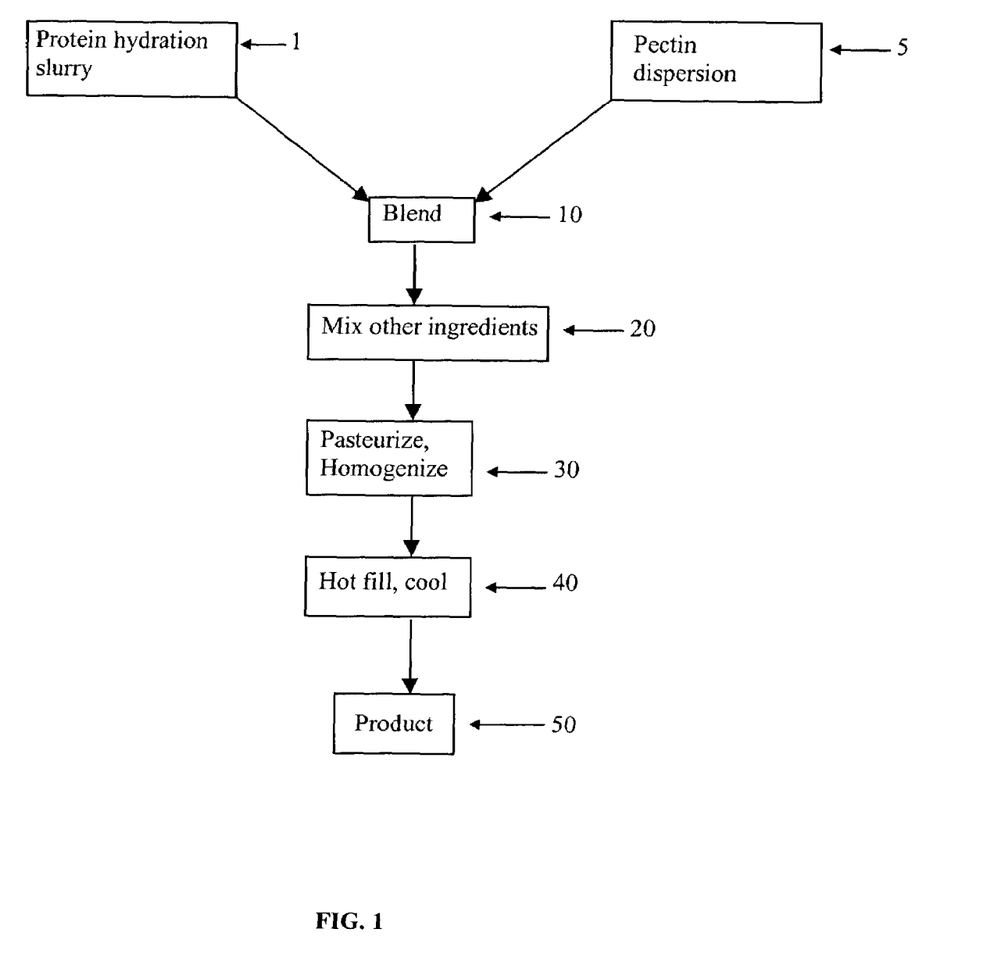
FIG. 1 is a block flow diagram of an industry wide process for producing a typical protein containing acid beverage wherein the protein hydration slurry and pectin hydration slurry are blended together and the remaining ingredients added followed by pasteurization and homogenization.

A protein based acid beverage is normally stabilized by a high methoxyl (HM) pectin that provides a stable suspension through possible steric stabilization and electrostatic repulsive mechanism. FIG. 1 refers to the normal processing conditions of protein stabilized acid beverages. At 1, protein is first dispersed in water at ambient temperature and hydrated at an elevated temperature for a period of time. The pH at 1 is about neutral. As a stabilizer, HM pectin is either hydrated separately into 2–3% dispersion or blended with sugar at 5 to give an HM pectin dispersion having a pH of 3.5 and then added into the protein slurry. The two slurries are mixed together at 10 for 10 minutes under agitation. The pH at 10 is about 7. Other ingredients such as additional sugar, fruit juices or vegetable juice, and various acids such as phosphoric acid, ascorbic acid citric acid, etc., are added at 20 to bring the pH to about 3.8. The contents are pasteurized at 195° F. for 30 seconds and then homogenized first at 2500 pounds per square inch and then at 500 pounds per square inch at 30. Containers are hot filled and cooled at 40 to give the product at 50 with a pH of 3.8. The problem with this method is that after the HM pectin is mixed with the protein, the pH of the blend is close to neutral, and HM pectin is potentially degraded by beta-elimination, especially under heat. This causes a decrease in the molecular weight of the pectin and the ability of the pectin to stabilize the proteins when the pH is later lowered even more is greatly reduced. HM pectin is only stable at room temperature. As the temperature increases, beta elimination begins, which results in chain cleavage and a very rapid loss of the ability of the HM pectin to provide a stable suspension.

Figure 2:
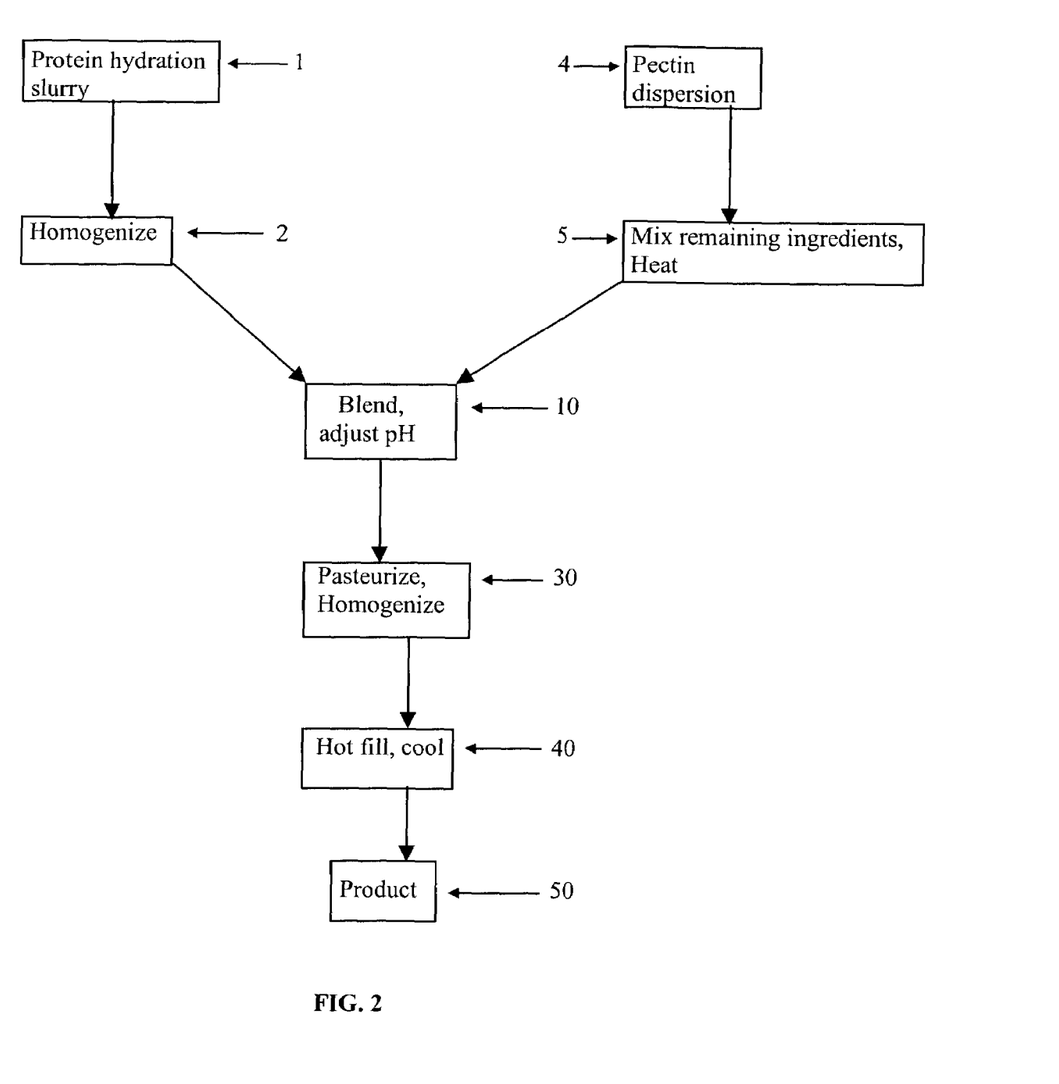
FIG. 2 is a block flow diagram of one embodiment of the invention for producing a protein containing acid beverage wherein the hydrated protein slurry is homogenized, the pectin slurry is hydrated and the remaining ingredients added to the pectin slurry and the two slurries blended together followed by pasteurization and homogenization in accordance with the principles of the invention.
Figure 3:
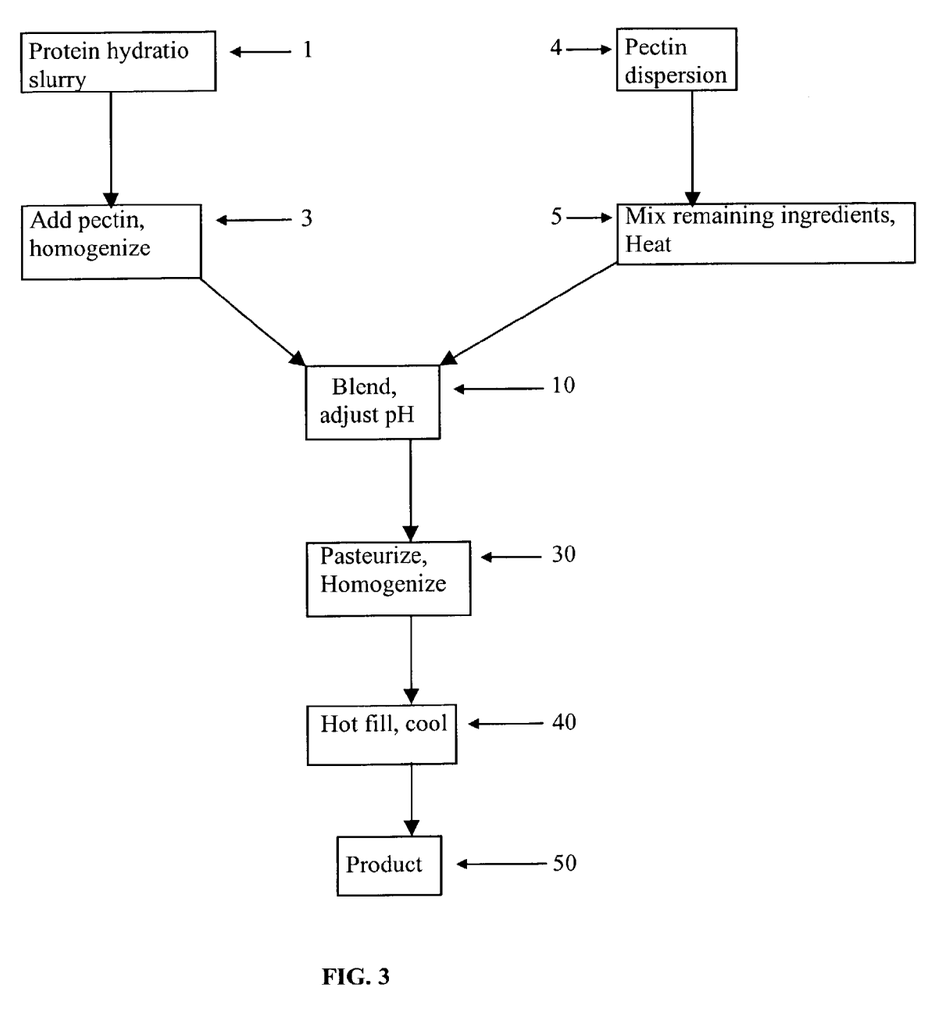
FIG. 3 is a block flow diagram of another embodiment of the invention for producing a protein containing acid beverage wherein protein and a portion of pectin are homogenized to a slurry, the remaining pectin is hydrated and the remaining ingredients added to the pectin slurry and the two slurries blended together followed by pasteurization and homogenization in accordance with the principles of the invention.

In the present invention, a hydrated protein material (A) and a hydrated protein material stabilizing agent-acid dispersion (B) are mixed together such that an acid beverage is obtained and the acid beverage forms a stable suspension. FIG. 2 and FIG. 3 refers to the processing conditions of the present invention.

FIG. 2 outlines the first embodiment of this invention. In FIG. 2, at 1 protein material is first dispersed in water at ambient temperature and hydrated at an elevated temperature for a period of time. The pH at 1 is about neutral. The hydrated protein material is then homogenized at 2 in two stages, a high pressure stage and a low pressure stage. The high pressure stage is 2500 pounds per square inch and the low pressure stage is at 500 pounds per square inch. The pH at 2 is still about neutral. The stabilizer pectin is hydrated separately into a 0.5–10% dispersion with or without sugar at 4. The pH at 4 is 3.5. At 5, other ingredients such as additional sugar, fruit juices, vegetable juices, various acids such as phosphoric acid, ascorbic acid, citric acid, etc. are added and the contents mixed at an elevated temperature. The slurry from 2 and the dispersion from 5 are blended together at 10 with additional acid to a pH of 3.8. At 30, the contents are pasteurized at a temperature of 180° F. for 30 seconds and homogenized in two stages—the high pressure stage of 2500 pounds per square inch and then the low pressure stage at 500 pounds per square inch Containers are hot filled and cooled at 40 to give the product at 50 with a pH of 3.8.

FIG. 3 outlines the second embodiment of this invention. In FIG. 3, at 1 protein material is first dispersed in water at ambient temperature and hydrated at an elevated temperature for a period of time. The pH at 1 is about neutral. A portion of the total stabilizer pectin charge (about 30%) is added at 3, mixed briefly and then homogenized at 3 in two stages, a high pressure stage and a low pressure stage. The high pressure stage is 2500 pounds per square inch and the low pressure stage is at 500 pounds per square inch. The pH at 3 is about 6.5. The remaining stabilizer is hydrated without sugar at 4. The pH at 4 is 3.5. At 5 other ingredients such as phosphoric acid, ascorbic acid, citric acid, juices, and sugars, etc. are added and the contents mixed at an elevated temperature. The slurry from 3 and the dispersion from 5 are blended together at 10 with additional acid to a pH of 3.8. At 30, the contents are pasteurized at a temperature of 195° F. for 30 seconds and homogenized in two stages—the high pressure stage of 2500 pounds per square inch and then the low pressure stage at 500 pounds per square inch. Containers are hot filled and cooled at 40 to give the product at 50 with a pH of 3.8.

Component (A)

The protein material of the process of the present invention may be any vegetable or animal protein that is at least partially insoluble in an aqueous acidic liquid, preferably in an aqueous acidic liquid having a pH of from 3.0 to 5.5, and most preferably in an aqueous acidic liquid having a pH of from 3.5 to 4.5. As used herein a "partially insoluble" protein material is a protein material that contains at least 10% insoluble material, by weight of the protein material, at a specified pH. Preferred protein materials useful in the composition of the present invention include soy protein materials, casein or caseinates, corn protein materials—particularly zein, and wheat gluten.

Soybean protein materials which are useful with the present invention are soy flour, soy concentrate, and, most preferably, soy protein isolate. The soy flour, soy concentrate, and soy protein isolate are formed from a soybean starting material which may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes.

Soy flour, as that term is used herein, refers to a comminuted form of defatted soybean material, preferably containing less than 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a soy protein content of about 40% to about 60%. Preferably the flour is very finely ground, most preferably so that less than about 1% of the flour is retained on a 300 mesh (U.S. Standard) screen.

Soy concentrate, as the term is used herein, refers to a soy protein material containing about 65% to about 90% of soy protein. Soy concentrate is preferably formed from a commercially available defatted soy flake material from which the oil has been removed by solvent extraction. The soy concentrate is produced by an acid leaching process or by an alcohol leaching process. In the acid leaching process, the soy flake material is washed with an aqueous solvent having a pH at about the isoelectric point of soy protein, preferably at a pH of about 4 to about 5, and most preferably at a pH of about 4.4 to about 4.6. The isoelectric wash removes a large amount of water soluble carbohydrates and other water soluble components from the flakes, but removes little of the protein, thereby forming a soy concentrate. The soy concentrate is dried after the isoelectric wash. In the alcohol leaching process, the soy flake material is washed with an aqueous ethyl alcohol solution wherein ethyl alcohol is present at about 60% by weight. The protein remains insoluble while the carbohydrate soy sugars of sucrose, stachyose and raffinose are leached from the defatted flakes. The soy soluble sugars in the aqueous alcohol are separated from the insoluble protein and the insoluble protein is dried to form the soy concentrate.

Soy protein isolate, as the term is used herein, refers to a soy protein material containing about 90% or greater protein content, and preferably about 95% or greater protein content. Soy protein isolate is typically produced from a starting material, such as defatted soybean material, in which the oil is extracted to leave soybean meal or flakes. More specifically, the soybeans may be initially crushed or ground and then passed through a conventional oil expeller. It is preferable, however, to remove the oil contained in the soybeans by solvent extraction with aliphatic hydrocarbons, such as hexane or azeotropes thereof, and these represent conventional techniques employed for the removal of oil. The defatted, soy protein material or soybean flakes are then placed in an aqueous bath to provide a mixture having a pH of at least about 6.5 and preferably between about 7.0 and 10 in order to extract the protein. Typically, if it is desired to elevate the pH above 6.7 various alkaline reagents such as sodium hydroxide, potassium hydroxide and calcium hydroxide or other commonly accepted food grade alkaline reagents may be employed to elevate the pH. A pH of above about 7 is generally preferred, since an alkaline extraction facilitates solubilization of the protein. Typically, the pH of the aqueous extract of protein, will be at least about 6.5 and preferably about 7.0 to 10. The ratio by weight of the aqueous extractant to the vegetable protein material is usually between about 20 to 1 and preferably a ratio of about 10 to 1. In an alternative embodiment, the vegetable protein is extracted from the milled, defatted flakes with water, that is, without a pH adjustment.

It is also desirable in obtaining the soy protein isolate used in the present invention, that an elevated temperature be employed during the aqueous extraction step, either with or without a pH adjustment, to facilitate solubilization of the protein, although ambient temperatures are equally satisfactory if desired. The extraction temperatures which may be employed, can range from ambient up to about 120° F. with a preferred temperature of 90° F. The period of extraction is further non-limiting and a period of time between about 5 to 120 minutes may be conveniently employed with a preferred time of about 30 minutes. Following extraction of the vegetable protein material, the aqueous extract of protein can be stored in a holding tank or suitable container while a second extraction is performed on the insoluble solids from the first aqueous extraction step. This improves the efficiency and yield of the extraction process by exhaustively extracting the protein from the residual solids from the first step.

The combined, aqueous protein extracts from both extraction steps, without the pH adjustment or having a pH of at least 6.5, or preferably about 7.0 to 10, are then precipitated by adjustment of the pH of the extracts to, at or near the isoelectric point of the protein to form an insoluble curd precipitate. The actual pH to which the protein extracts are adjusted will vary depending upon the vegetable protein material employed but insofar as soy protein, this typically is between about 4.0 and 5.0. The precipitation step may be conveniently carried out by the addition of a common food grade acidic reagent such as acetic acid, sulfuric acid, phosphoric acid, hydrochloric acid or with any other suitable acidic reagent. The soy protein precipitates from the acidified extract, and is then separated from the extract. The separated protein may be washed with water to remove residual soluble carbohydrates and ash from the protein material. The separated protein is then dried using conventional drying means to form a soy protein isolate. Soy protein isolates are commercially available from Solae® LLC, for example, as SUPRO® PLUS 675, FXP 950, FXP HO120, SURPO® XT 40, SUPRO® 710, SUPRO® 720, ALPHA™ 5800, ALPHA™ 5812 and ALPHA™ 5811.

Preferably the protein material used in the present invention, is modified to enhance the characteristics of the protein material. The modifications are modifications which are known in the art to improve the utility or characteristics of a protein material and include, but are not limited to, denaturation and hydrolysis of the protein material.

The protein material may be denatured and hydrolyzed to lower the viscosity. Chemical denaturation and hydrolysis of protein materials is well known in the art and typically consists of treating a protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a protein material are: a pH of up to about 10, preferably up to about 9.7; a temperature of about 50° C. to about 80° C. and a time period of about 15 minutes to about 3 hours, where the denaturation and hydrolysis of the protein material occurs more rapidly at higher pH and temperature conditions.

Hydrolysis of the protein material may also be effected by treating the protein material with an enzyme capable of hydrolyzing the protein. Many enzymes are known in the art which hydrolyze protein materials, including, but not limited to, fungal proteases, pectinases, lactases, and chymotrypsin. Enzyme hydrolysis is effected by adding a sufficient amount of enzyme to an aqueous dispersion of protein material, typically from about 0.1% to about 10% enzyme by weight of the protein material, and treating the enzyme and protein dispersion at a temperature, typically from about 5° C. to about 75° C., and a pH, typically from about 3 to about 9, at which the enzyme is active for a period of time sufficient to hydrolyze the protein material. After sufficient hydrolysis has occurred the enzyme is deactivated by heating, and the protein material is precipitated from the solution by adjusting the pH of the solution to about the isoelectric point of the protein material.

A particularly preferred modified soy protein material is a soy protein isolate that has been enzymatically hydrolyzed and deamidated under conditions that expose the core of the proteins to enzymatic action as described in European Patent No. 0 480 104 B1, which is incorporated herein by reference. Briefly, the modified protein isolate material disclosed in European Patent No. 0 480 104 B1 is formed by: 1) forming an aqueous slurry of a soy protein isolate; 2) adjusting the pH of the slurry to a pH of from 9.0 to 11.0; 3) adding between 0.01 and 5% of a proteolytic enzyme to the slurry (by weight of the dry protein in the slurry); 4) treating the alkaline slurry at a temperature of 10° C. to 75° C. for a time period effective to produce a modified protein material having a molecular weight distribution (Mn) between 800 and 4000 and a deamidation level of between 5% to 48% (typically between 10 minutes to 4 hours); and deactivating the proteolytic enzyme by heating the slurry above 75° C. The modified protein material disclosed in European Patent No. 0 480 104 B1 is commercially available from Protein Technologies International, Inc of St. Louis, Mo.

Casein protein materials useful in the process of the present invention are prepared by coagulation of a curd from skim milk. The casein is coagulated by acid coagulation, natural souring, or rennet coagulation. To effect acid coagulation of casein, a suitable acid, preferably hydrochloric acid, is added to milk to lower the pH of the milk to around the isoelectric point of the casein, preferably to a pH of from 4.0 to 5.0, and most preferably to a pH of from 4.6 to 4.8. To effect coagulation by natural souring, milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Corn protein materials that are useful in the of the present invention include corn gluten meal, and most preferably, zein. Corn gluten meal is obtained from conventional corn refining processes, and is commercially available. Corn gluten meal contains about 50% to about 60% corn protein and about 40% to about 50% starch. Zein is a commercially available purified corn protein which is produced by extracting corn gluten meal with a dilute alcohol, preferably dilute isopropyl alcohol.

Wheat protein materials that are useful in the process of the present invention include wheat gluten. Wheat gluten is obtained from conventional wheat refining processes, and is commercially available.

In one embodiment of this invention, water is added in sufficient quantity to form a slurry in order to hydrate the protein material. It is critical to hydrate the protein material. A suitable slurry (A), once hydrated and homogenized, contains from 1–10% by weight solids based on the weight of the slurry. More preferably, the slurry (A) contains from 3–8% by weight solids. Most preferably the slurry (A) contains from 5–7% by weight solids. At this solids concentration which is indicated as most preferred for the slurry, the most complete hydration is obtained in the protein. Thus, the water in the slurry is used most efficiently at this concentration.

Once the protein material is hydrated, it then is homogenized. Homogenization serves to decrease the particle size of the protein in the protein slurry (A). Preferably the slurry is transferred to a Gaulin homogenizer (model 15MR) and is homogenized in two stages, a high pressure stage and a low pressure stage. The high pressure stage is from 1500–5000 pounds per square inch and preferably from 2000–3000 pounds per square inch. The low pressure stage is from 300–1000 pounds per square inch and preferably from 400–700 pounds per square inch.

Component (B)

The present invention also employs a stabilizing agent and the stabilizing agent is a hydrocolloid comprising alginate, microcrystalline cellulose, jellan gum, tara gum, carrageenan, guar gum, locust bean gum, xanthan gum, cellulose gum and pectin. A preferred hydrocolloid is pectin. As used herein, the term "pectin" means a neutral hydrocolloid that consists mainly of partly methoxylated polygalacturonic acid. The term "high methoxyl pectin" as used herein means a pectin having a degree of methoxyl esterification of fifty percent (50%) or greater. High methoxyl (HM) pectins useful in the present invention are commercially available. One supplier is Copenhagen Pectin A/S, a division of Hercules Incorporated, DK-4623, Lille Skensved, Denmark. Their products are identified as Hercules YM100L, Hercules YM100H, Hercules YM115L, Hercules YM115H and Hercules YM150H. Hercules YM100L contains about 56% galacturonic acid, where about 72% (±2%) of the galacturonic acid is methylated. Another supplier is Danisco A/S of Copenhagen, Denmark and they supply AMD783.

In order to prepare the hydrated protein stabilizing agent-acid dispersion (B), water and pectin are added in sufficient quantity to form a dispersion. A sweetener may be added this point or later or a portion of the sweetener added here and also added later. Preferred sweeteners comprise sucrose, corn syrup, and may include dextrose and high fructose corn syrup and artificial sweeteners. The pectin is hydrated in the same manner as the protein, above. The term "dispersion" means a colloidal suspension. After hydration is complete, acid is added to the dispersion. The acid added to the dispersion comprises a fruit juice, a vegetable juice, citric acid, malic acid, tartaric acid, lactic acid, ascorbic acid glucone delta lactone, phosphoric acid or combinations thereof. Pectin is present in (B) at from 0.5–10% by weight and preferably from 0.75–5% by weight. It is necessary in the present invention to keep the hydrated protein stabilizing agent-acid dispersion (B) at a pH lower than 7 to eliminate pectin being degraded by beta-elimination. To this end, the pH of (B) is maintained at between 2.0–5.5.

Components (A) and (B) are then blended together and the blend has a pH of from 3.0–4.5, preferably from 3.5–4.2 and most preferably from 3.8–4.0 and subjected to a sterilization or pasteurization step by heating the (A) and (B) blend at a relatively high temperature for a short period of time. This pasteurization step kills microorganisms in the (A) and (B) blend. For example, an effective treatment for killing microorganisms in the (A) and (B) blend involves heating the (A) and (B) blend to a temperature of about 180° F. for about 10 seconds, preferably to a temperature of at least 190° F. for at least 30 seconds and most preferably at a temperature of 195° F. for 60 seconds. While a temperature lower than 180° F. may work, a temperature of at least 180° F. provides a safety factor. Temperatures greater than 200° F. also have an effect on the killing of microorganisms. However, the cost associated with the higher temperature does not translate to a product that contains appreciably fewer harmful microorganisms. Further, pasteurizing at too high a temperature for too long a period of time may cause the protein to further denature, which generates more sediment due to the insolubility of the further denatured protein.

The (A) and (B) blend, once pasteurized is then subjected to a homogenization step, which is preferably identical to the two-stage homogenization step outlined above for (A). The homogenized suspension is a stable suspension of a protein material in an acidic beverage.

Component ($A^1$)

In another embodiment of this invention, a portion of the protein stabilizing agent is combined with the protein material and this protein material-protein stabilizing agent mixture is hydrated and homogenized to form ($A^1$). Hydration and homogenization is carried out in the same manner as disclosed in the preparation of component (A) above. The protein material for ($A^1$) is identical to the protein material disclosed in (A). The protein stabilizing agent used in conjunction with the protein material is disclosed above as part of Component (B). The preferred stabilizing agent is HM pectin. The ratio of protein material:protein stabilizing agent is generally from 10–20:1 and preferably from 12–18:1 on a dry basis. Water is added in sufficient quantity to form a slurry in order to hydrate the protein material and pectin. It is critical to hydrate both the protein material and the protein stabilizing agent. Once the protein material-protein stabilizing agent is hydrated, it is then homogenized to form ($A^1$). Homogenization is conducted in the same manner as within (A). A suitable slurry ($A^1$) contains from 1–10% by weight solids based on the weight of the slurry, preferably from 3–8% by weight solids and most preferably from 5–7% by weight solids. At this solids concentration which is indicated as most preferred for the slurry, the most complete hydration is obtained in the protein material and the pectin. Thus, the water in the slurry is used most efficiently at this concentration.

Components ($A^1$) and (B) are then blended together and the blend has a pH of from 3.0–4.5, preferably from 3.5–4.2 and most preferably from 3.8–4.0 and subjected to a pasteurization step by heating the ($A^1$) and (B) blend at a relatively high temperature for a short period of time. Both ($A^1$) and (B) contain the protein stabilizing agent. When ($A^1$) and (B) are blended together, it is at a protein stabilizing agent ratio contained within ($A^1$) and (B) of (B):($A^1$) of from 1–5:1. The pasteurization step is preferably the same as the (A) and (B) blend pasteurization disclosed above.

The ($A^1$) and (B) blend, once pasteurized is then subjected to a homogenization step, which is preferably identical to the two-stage homogenization step outlined above for (A). The homogenized suspension is a stable suspension of a protein material in an acidic beverage.

Examples A–D are baseline process examples as defined within FIG. 1.

EXAMPLE A

A 6.5 g protein per 8 oz serving fortified juice beverage is made using Supro® Plus 675 made by Solae® LLC.

Added to a vessel are 5494 g of distilled water followed by 332 g of Supro Plus 675. The contents at 5.70% solids are dispersed under medium shear, mixed for 5 minutes, followed by heating to 170° F. for 10 minutes to give a protein suspension slurry. In a separate vessel, 60 grams of pectin (YM-100L) are dispersed into 2940 grams of distilled water under high shear to give a 2% pectin dispersion. The dispersion is heated to 170° F. until no lumps are observed. The pectin dispersion is added into the protein suspension slurry and mixed for 5 minutes under medium shear. This is followed by the addition of 27 grams of citric acid, 27 grams of phosphoric acid, 210 grams of concentrated apple juice and 1000 grams of sugar. The contents are mixed for 5 minutes under medium shear. The pH of this mixture at room temperature is in the range of 3.8–4.0. The contents are pasteurized at 195° F. for 30 seconds, and homogenized at 2500 pounds per square inch in the first stage and 500 pounds per square inch in the second stage to give a protein stabilized acid beverage. Bottles are hot filled with the beverage at 180–185° F. The bottles are inverted, held for 2 minutes and then placed in ice water to bring the temperature of the contents to about room temperature. After the contents of the bottles are brought to about room temperature, the bottles are stored at room temperature for 6 months.

EXAMPLE B

The procedure of Example A is repeated except that the protein Supro® Plus 675 is replaced with the protein FXP 950 made by Solae® LLC.

EXAMPLE C

The procedure of Example A is repeated except that the protein Supro® Plus 675 is replaced with the protein FXP HO120 made by Solae® LLC.

EXAMPLE D

The procedure of Example A is repeated except that the protein Supro® Plus 675 is replaced with the protein Supro® XT 40 made by Solae® LLC.

The invention having been generally described above, may be better understood by reference to the examples described below. The following examples represent specific but non-limiting embodiments of the present invention.

Examples 1–3 are directed to the preparation of a stabilized acid beverage using components (A) and (B) as defined within FIG. 2.

EXAMPLE 1

A 6.5 g protein per 8 oz serving fortified juice beverage is made using Supro Plus 675 made by Solae LLC.

Added to a vessel are 5400 g of distilled water followed by 332 g of Supro Plus 675. The contents at 6.15% solids are dispersed under medium shear, mixed for 5 minutes followed by heating to 170° F. for 10 minutes to give a protein slurry. In a separate vessel, 60 grams of pectin (YM-100L) and 300 grams of sugar are dispersed into 2940 grams of distilled water under high shear to give a 2% pectin dispersion. The dispersion is heated to 170° F. When the pectin is totally dispersed (without lump), added are 27 grams of citric acid, 27 grams of phosphoric acid, 210 grams of concentrated apple juice and 700 grams of sugar. These contents are combined under medium shear, and then mixed for 5 minutes. The solids level of the pectin slurry is at 30%. The protein slurry and the pectin dispersion are combined and mixed for 5 minutes. The pH at room temperature is in the range of 3.8–4.0. The contents are pasteurized at 195° F. for 30 seconds, and homogenized at 2500 psi in the first stage and 500 psi in the second stage to give a protein stabilized acid beverage. Bottles are hot filled with the beverage at 180–185° F. The bottles are inverted, held for 2 minutes and then placed in ice water to bring the temperature of the contents to about room temperature. After the contents of the bottles are brought to about room temperature, the bottles are stored.

EXAMPLE 2

A 6.5 g protein per 8 oz serving fortified juice beverage is made using FXP 950 made by Solae® LLC.

Added to a vessel are 5344 grams of distilled water followed by 332 grams of FXP 950. The contents at 6.22% solids are dispersed under medium shear, mixed for 5 minutes, then heated to 170° F. for 10 minutes to give a protein slurry. The protein slurry is pasteurized at 190° F. for 15 seconds. In a separate vessel, 57 grams of pectin (YM-100L) and 300 grams of sugar are dispersed into 2943 grams of distilled water under high shear to give a 2% pectin dispersion. Then added are 27 grams of citric acid, 27 grams of phosphoric acid, 210 grams of concentrated apple juice and 700 grams of sugar and mixed for 10 minutes. This pectin dispersion has a solids level of 30%. The protein slurry and the pectin dispersion are combined and mixed for 5 minutes under agitation. The pH at room temperature is 3.8–4.0. The combined slurry and dispersion are subjected to pasteurization at 195° F. for 30 seconds and homogenization at 2500 psi in the first stage and 500 psi in the second stage to give a protein stabilized acid beverage. Bottles are hot filled with the beverage at 175-185° F. The bottles are inverted, held for 2 minutes and then placed in ice water to bring the temperature of the contents to about room temperature. After the contents of the bottles are brought to about room temperature, the bottles are stored.

EXAMPLE 3

A 3.0 g protein per 8 oz serving fortified juice beverage is made using FXP HO120 made by Solae® LLC.

Added to a vessel are 5000 grams of distilled water along with 15 grams of sodium citrate and 143 grams of FXP HO120. The contents at 3.06% solids are dispersed under medium shear, mixed for 5 minutes and then heated to 150° F. for 10 minutes to give a protein slurry. In a separate vessel, 39 grams of pectin (YM-100H) and 1000 grams of sugar are dispersed into 3506 grams of distilled water under high shear to give a 1.3% pectin dispersion. Added are 35 grams of citric acid and 164 grams of concentrated apple juice under medium shear, and mixed for 10 minutes at 170° F., followed by homogenization first at 2000 pounds per square inch and then at 500 pounds per square inch. This pectin dispersion has a solids level of 26.6%. The protein slurry and the pectin dispersion are combined and mixed for 5 minutes. The pH at room temperature is in the range of 3.8–4.0. The contents are pasteurized at three pasteurization settings (190° F., 200° F. and 210° F. for 30 seconds, and homogenized at 2500 psi in the first stage and 500 psi in the second stage. Bottles are hot filled with the beverage at 175–185° F. The bottles are inverted, held for 2 minutes and then placed in ice water to bring the temperature of the contents to about room temperature. After the contents of the bottles are brought to about room temperature, the bottles are stored and sediment values are determined at one month and at six months.

| Pasteurization method | % Sediment at one month | | % Sediment at six months |
|---|---|---|---|
| | 4° C. | 25° C. | 25° C. |
| 190° F./30 sec | 0 | 1.08 | 4.33 |
| 200° F./30 sec | 0.56 | 1.13 | 4.45 |
| 210° F./30 sec | 1.13 | 1.12 | 5.59 |

Examples 4 and 5 are directed to the preparation of a stabilized acid beverage using components ($A^1$) and (B) as defined within FIG. 3.

EXAMPLE 4

A 6.5 g protein per 8 oz serving fortified juice beverage is made using FXP HO120 made by Solac® LLC.

Added to a vessel are 20 grams of sodium citrate and 5000 grams of distilled water and stirred for 1 minute, followed by 307 grams of FXP HO120. The contents are mixed under medium shear, for 5 minutes to give a protein slurry that contained 6.14% solids. The contents are then heated to 180° F. for 8 minutes. Added to the protein slurry is 20 grams of pectin (YM-100H) and mixed for 2 minutes. The protein/pectin mixture is homogenized at 2500 pounds per square inch and then at 500 pounds per square inch. In a separate vessel is added 40 grams of pectin (YM-100H), 1000 grams of sugar and 3360 grams of distilled water and the contents are mixed under high shear to give a dispersion that contained 1.18% pectin. Then added are 35 grams of citric acid, 20 grams of phosphoric acid and 164 grams of concentrated apple juice under medium shear, mixed for 5 minutes, and heated to 190° F. This pectin dispersion has a solids level of 26.9%. The protein slurry and the pectin dispersion are combined and mixed for 5 minutes. The pH at room temperature is between 3.8–4.0. The protein/pectin contents are then pasteurized at 195° F. for 60 seconds, and homogenized at 2500 pounds per square inch in the first stage and 500 pounds per square inch in the second stage. Bottles are hot filled with the beverage at 175–185° F. The bottles are inverted, held for 2 minutes, then placed in ice water to bring the temperature of the contents to about room temperature. After the contents of the bottles are brought to about room temperature, the bottles are stored.

EXAMPLE 5

A 6.5 g protein per 8 oz serving fortified juice beverage is made using SUPRO® XT 40 made by Solac® LLC.

Added to a vessel are 20 grams of sodium citrate and 5000 grams of distilled water and stirred for 1 minute, followed by 331 grams of SUPRO® XT 40. The contents are mixed under medium shear for 5 minutes to give a protein slurry that contains 6.56% solids. The contents are heated to 180° F. for 8 minutes. Added to the protein slurry is 20 grams of pectin (YM-100H) and mixed for 2 minutes. The protein/pectin mixture is homogenized at 2500 pounds per square inch and then at 500 pounds per square inch. In a separate vessel is added 40 grams of pectin (YM-100H) 1000 grams of sugar and 3360 grams of distilled water and the contents are mixed under high shear to give a dispersion that contains 1.18% pectin. Then added is 35 grams of citric acid, 30 grams of phosphoric acid and 164 grams of concentrated apple juice under medium shear, mixed for 5 minutes and heated to 190° F. This pectin dispersion has a solids level of 26.9%. The protein slurry and the pectin dispersion are combined and mixed for 5 minutes. The pH at room temperature is between 3.8–4.0. The protein/pectin contents are then pasteurized at 195° F. for 60 seconds, and homogenize at 2500 pounds per square inch in the first stage and 500 pounds per square inch in the second stage. Bottles are hot filled with the beverage at 175–185° F. The bottles are inverted, held for 2 minutes, then placed in ice water to bring the temperature of the contents to about room temperature. After the contents of the bottles are brought to about room temperature, the bottles are stored.

The baseline process beverage examples A–D and the inventive process beverage examples 1, 2, 4 and 5 are compared to each other, protein for protein, in storage sediment values in Table I. That is, Supro® 675 is the protein for Examples A and 1, FXP 950 is the protein for Examples B and 2, FXT H0120 is the protein for Examples C and 4 and Supro® XT 40 is the protein for Examples D and 5.

TABLE 1

| | % Storage Sediment Values | | | | |
|---|---|---|---|---|---|
| | One Month | | Five Months | Six Months | |
| Example | 4° C. | 25° C. | 25° C. | 4° C. | 25° C. |
| A | — | — | — | — | 10.99 |
| 1 | — | — | — | — | 3.42 |
| B | 6.26 | 5.89 | — | 10.01 | 11.56 |
| 2 | 3.18 | 3.47 | — | 6.91 | 8.87 |
| C | 1.1 | 2.71 | 9.58 | — | — |
| 4 | 0.0 | 0.0 | 7.45 | — | — |
| D | 3.44 | 3.26 | 6.16 | — | — |
| 5 | 2.12 | 2.9 | 5.09 | — | — |

It is observed from the storage sediment data of the above examples that the embodiments encompassing the process of this invention offer an improvement in less sediment in preparing a protein based acid beverage over the normal process for preparing the beverage.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A process for preparing a stable suspension of a protein material in an acidic beverage, comprising; blending
   (A) a hydrated and homogenized protein material slurry wherein the homogenization is carried out in two stages of a high pressure stage of from 2000–3000 pounds per square inch and a low pressure stage of from 300–1000 pounds per square inch, with
   (B) a hydrated protein stabilizing agent-acid dispersion consisting essentially of a hydrated high methoxyl pectin protein stabilizing agent-acid dispersion, and pasteurizing and homogenizing the blend, wherein the homogenization is carried out in two stages of a high pressure stage of from 2000–3000 pounds per square inch and a low pressure stage of from 300–1000 pounds per square inch. wherein the suspension delivers at least 3.0 grams protein per 8 ounce serving and wherein the pectin is present in an amount of at least 0.82 grams pectin per 8 ounce serving.

2. The process of claim 1 wherein the protein material comprises a soybean protein material, casein, wheat gluten or zein.

3. The process of claim 2 wherein the soybean protein material comprises soy flour, soy concentrate or soy protein isolate.

4. The process of claim 2 wherein the soybean protein material comprises soy protein isolate.

5. The process of claim 1 wherein the acid of the acid slurry comprises a fruit juice, a vegetable juice, citric acid, malic acid, tartaric acid, lactic acid, ascorbic acid, glucono delta lactone or phosphoric acid.

6. The process of claim 1 wherein within (A), the slurry has a solids content of from 1–10% by weight.

7. The process of claim 1 wherein within (A), the slurry has a solids content of from 3–8% by weight.

8. The process of claim 1 wherein within (A), the slurry has a solids content of from 5–7% by weight.

9. The process of claim 1 wherein within (B), the stabilizing agent is present at from 0.5–5% by weight.

10. The process of claim 1 wherein the pH of (B) is from 2.0–5.5.

11. The process of claim 1 wherein the pH of the blended slurries prior to pasteurization and homogenization is from 3.0–4.5.

12. The process of claim 1 wherein the pH of the blended slurries prior to pasteurization and homogenization is from 3.5–4.2.

13. The process of claim 1 wherein the pH of the blended slurries prior to pasteurization and homogenization is from 3.8–4.0.

14. The process of claim 1 wherein pasteurization is carried out at a temperature of at least 180° F. for at least 10 seconds.

15. The process of claim 1 wherein pasteurization is carried out at a temperature of at least 190° F. for at least 30 seconds.

16. The process of claim 1 wherein pasteurization is carried out at a temperature of at least 195° F. for at least 60 seconds.

17. The process of claim 1 wherein the low pressure stage is from 400–700 pounds per square inch.

18. A process for preparing a stable suspension of a protein material in an acidic beverage, comprising; blending
   ($A^1$) a hydrated and homogenized protein material-protein stabilizing agent slurry wherein the homogenization is carried out in two stages of a high pressure stage of from 2000–3000 pounds per square inch and a low pressure stage of from 300–1000 pounds per square inch, with
   (B) a hydrated protein stabilizing agent-acid dispersion consisting essentially of a hydrated high methoxyl pectin protein stabilizing agent-acid dispersion and pasteurizing and homogenizing the blend, wherein (B) is added to ($A_1$), wherein the homogenization is carried out in two stages of a high pressure stage of from 2000–3000 pounds per square inch and a low pressure stage of from 300–1000 pounds per square inch wherein the suspension delivers at least 3.0 grams protein per 8 ounce serving and wherein the pectin is present in an amount of at least 1.18 grams pectin per 8 ounce serving.

19. The process of claim 18 wherein the protein material comprises a soybean protein material, casein, wheat gluten or zein.

20. The process of claim 19 wherein the soybean protein material comprises soy flour, soy concentrate or soy protein isolate.

21. The process of claim 19 wherein the soybean protein material comprises soy protein isolate.

22. The process of claim 18 wherein the acid of the acid slurry comprises a fruit juice, a vegetable juice, citric acid, malic acid, tartaric acid, lactic acid, ascorbic acid, glucono delta lactone or phosphoric acid.

23. The process of claim 18 wherein within (A), the protein material:protein stabilizing agent ratio is from 10–20:1.

24. The process of claim 18 wherein within (A), the protein material:protein stabilizing agent ratio is from 12–18:1.

25. The process of claim 18 wherein the slurry has a percent solids of from 1–10% by weight.

26. The process of claim 18 wherein within (A), the slurry has a percent solids of from 3–8% by weight.

27. The process of claim 18 wherein within (A), the slurry has a percent solids of from 5–7% by weight.

28. The process of claim 18 wherein within (B), the protein stabilizing agent is present at from 0.5–5% by weight.

29. The process of claim 18 wherein the (B):(A) protein stabilizing agent ratio is from 1–5:1.

30. The process of claim 18 wherein the pH of (B) is from 2.0–5.5.

31. The process of claim 18 wherein the pH of the blended slurries prior to pasteurization and homogenization is from 3.0–4.5.

32. The process of claim 18 wherein the pH of the blended slurries prior to pasteurization and homogenization is from 3.5–4.2.

33. The process of claim 18 wherein the pH of the blended slurries prior to pasteurization and homogenization is from 3.8–4.0.

34. The process of claim 18 wherein pasteurization is carried out at a temperature of at least 180° F. for at least 10 seconds.

35. The process of claim 18 wherein pasteurization is carried out at a temperature of at least 190° F. for at least 30 seconds.

36. The process of claim 18 wherein pasteurization is carried out at a temperature of at least 195° F. for at least 60 seconds.

37. The process of claim 18 wherein the low pressure stage is from 400–700 pounds per square inch.

* * * * *